(12) United States Patent
Nishzawa et al.

(10) Patent No.: US 8,339,509 B2
(45) Date of Patent: *Dec. 25, 2012

(54) ELECTRONIC DEVICE AND CAMERA

(75) Inventors: Akio Nishzawa, Yokohama (JP); Takayuki Shirotani, Hiroshima (JP)

(73) Assignee: Nikon Corporation, Tokyo (JP)

( * ) Notice: Subject to any disclaimer, the term of this patent is extended or adjusted under 35 U.S.C. 154(b) by 269 days.

This patent is subject to a terminal disclaimer.

(21) Appl. No.: 12/010,063

(22) Filed: Jan. 18, 2008

(65) Prior Publication Data

US 2008/0117327 A1    May 22, 2008

Related U.S. Application Data

(63) Continuation of application No. 10/866,704, filed on Jun. 15, 2004, now abandoned.

(30) Foreign Application Priority Data

Jun. 23, 2003  (JP) .................................. 2003-177795

(51) Int. Cl.
*H04N 5/225*  (2006.01)
(52) U.S. Cl. ....................................................... 348/372
(58) Field of Classification Search .................... 348/372
See application file for complete search history.

(56) References Cited

U.S. PATENT DOCUMENTS

| 6,057,051 | A  | * | 5/2000 | Uchida et al. | .................... | 429/19 |
| 6,447,945 | B1 | * | 9/2002 | Streckert et al. | ................. | 429/34 |
| 6,714,248 | B1 | * | 3/2004 | Inoue | ............................ | 348/372 |
| 6,912,006 | B2 | * | 6/2005 | Shimizu | ......................... | 348/364 |
| 7,983,554 | B2 | * | 7/2011 | Nishizawa | ..................... | 396/301 |
| 2004/0013927 | A1 | * | 1/2004 | Lawrence et al. | ............... | 429/34 |

FOREIGN PATENT DOCUMENTS

| JP | 2003-344919 A |   | 3/2003 |
| JP | 2003344919 A | * | 12/2003 |

* cited by examiner

*Primary Examiner* — Anthony J Daniels
(74) *Attorney, Agent, or Firm* — Oliff & Berridge, PLC (57) ABSTRACT

The object of the present invention is to enable reliable supply of oxygen which is necessary for a fuel cell to generate electric power, to the fuel cell. In a bottom surface of a casing of a camera, a tripod socket for mounting a tripod is disposed in the vicinity of the right end portion, and air orifices for linking the space inside a cell compartment for accommodating a fuel cell with the outside of the casing is disposed in the vicinity of the left end portion, respectively. As a result, even when the tripod is connected to the camera, the air orifices are not closed by the pan head of the tripod, oxygen (air) can be constantly supplied to the fuel cell accommodated inside the cell compartment, and the fuel cell can continuously generate a sufficient quantity of electricity. The present invention can be employed in a camera.

11 Claims, 12 Drawing Sheets

ELECTRONIC DEVICE AND CAMERA

This is a Continuation of application Ser. No. 10/866,704 filed Jun. 15, 2004. The disclosure of the prior application is hereby incorporated by reference herein in its entirety.

BACKGROUND OF THE INVENTION

1. Field of the Invention

The present invention relates to an electronic device and a camera, and more particularly to an electronic device and a camera in which, when a fuel cell is used as a power source for the electronic device and camera, oxygen necessary for the fuel cell to generate electric power can be reliably supplied to the fuel cell.

2. Description of the Related Art

Following recent miniaturization and improved functionality of electronic devices such as cellular phones and cameras, the batteries serving as power sources for the electronic devices are also required to be further miniaturized and to have improved functionality.

Small fuel cells that have an energy density higher than that of the batteries that have been conventionally used, such as lithium ion batteries, have recently attracted much attention, and commercialization of electronic devices using fuel cells as a power source has been researched and developed.

Thus, electronic devices using fuel cells as a power source are still at the stage of research and development. Therefore, there are no adequate references relating to prior art.

A sufficient amount of oxygen is necessary for the fuel cells to generate electric power and, therefore, the supply of oxygen present in the air to the fuel cells has been considered. In this case, it is necessary to provide for sufficient contact of a fuel cell accommodated inside a casing with the air present outside the casing.

However, when a user employs a small electronic device, for example, a camera, the user either holds the casing with a hand or holds it by connecting to a tripod or the like. Thus, small electronic devices are held differently in a variety of places, rather than being constantly fixed to a prescribed place (the prescribed device is held in the prescribed place), as large television receivers.

Further, small electronic devices are now required to demonstrate not only a high performance, but also a good design.

Therefore, in order to commercialize the electronic devices using a fuel cell as a power source, it is necessary to take measures providing for sufficient contact of air with the fuel cell accommodated inside the casing of the electronic device, regardless of the way the casing is held.

However, the problem was that the effective measures have yet to be developed.

With the foregoing in view, it is an object of the present invention to enable reliable supply of oxygen, which is necessary for a fuel cell to generate electric power, to the fuel cell, when the fuel cell is used as a power source for an electronic device or camera.

SUMMARY OF THE INVENTION

The first electronic device in accordance with the present invention comprises a cell compartment inside a casing of the electronic device for accommodating a fuel cell serving as a power source, an opening disposed in a prescribed surface of the casing, for linking the space inside the cell compartment with the outside of the casing and introducing external air into the cell compartment inside the casing, and a mounting unit disposed on the same surface where the opening is disposed, for mounting other devices on the first electronic device, wherein the mounting unit is disposed in the vicinity of one end portion of the surface of the casing and the opening is disposed in the vicinity of the other end portion.

The first electronic device can be a camera, the other device can be a tripod, and the mounting unit can be a tripod socket.

The tripod socket can be disposed either on the right side or left side with respect to a pickup optical axis of the camera which is substantially parallel with the surface of the casing, and the opening can be disposed on the other side.

The tripod socket and the opening can be disposed in the vicinity of one end portion and in the vicinity of the other end portion in the direction of the pickup optical axis of the camera which is substantially parallel with the surface of the casing, respectively.

The first electronic device can further comprise a lens-barrel having a taking lens at the front surface thereof, wherein the surface where the opening and the tripod socket are disposed can be the lower surface of the casing, which is substantially perpendicular to the front surface of the casing at the side where the taking lens is disposed, the cell compartment can be disposed between the rear surface of the casing and the rear surface of the lens-barrel inside the casing, and the opening can be disposed in the portion of the lower surface of the casting, which is below the cell compartment.

In the first electronic device in accordance with the present invention, a mounting portion for mounting another device on the first electronic device is disposed in the vicinity of one end portion on a prescribed surface constituting the casing, and the opening for linking the space inside the cell compartment for accommodating the fuel cell, which is the power source of the first electronic device, with the outside of the casing is disposed in the vicinity of the other end portion.

The second electronic device in accordance with the present invention comprises a cell compartment inside a casing of the electronic device for accommodating a fuel cell serving as a power source, an opening disposed in a prescribed surface of the casing, for linking the space inside the cell compartment with the outside of the casing and introducing external air into the cell compartment inside the casing, and a mounting unit disposed on the surface where the opening is disposed, for mounting other devices on the second electronic device, wherein the opening is disposed in a second portion of the surface of the casing, which is recessed with respect to a first portion where the mounting unit is disposed.

The second electronic device can be a camera, the other device can be a tripod, and the mounting unit can be a tripod socket.

In the second electronic device in accordance with the present invention, the mounting unit for mounting other devices on the second electronic device is disposed in a first portion of the prescribed surface of the casing, and the opening for linking the space inside the cell compartment for accommodating a fuel cell serving as a power source with the outside of the casing is disposed in a second portion which is recessed with respect to the first portion.

The third electronic device in accordance with the present invention comprises a cell compartment inside a casing of the electronic device for accommodating a fuel cell serving as a power source, a first opening disposed in the first external surface of the casing, for linking the space inside the cell compartment with the outside of the casing and introducing external air into the cell compartment inside the casing, and a second opening disposed in the second external surface of the casing, which is different from the first surface, for linking the space inside the cell compartment with the outside of the casing and introducing external air into the cell compartment inside the casing.

The third electronic device can be a camera having a taking lens, and the first surface can be a lower surface of the casing which is substantially perpendicular to the front surface of the casing on the side where the taking lens is disposed.

In the third electronic device in accordance with the present invention, the first opening for linking the space inside the cell compartment for accommodating a fuel cell serving as a power source of the third electronic device with the outside of the casing is disposed in a first surface of the casing, and the second opening for linking the space inside the cell compartment with the outside of the casing is disposed in a second surface of the casing, which is different from the first surface.

The fourth electronic device in accordance with the present invention, comprises a cell compartment inside a casing of the electronic device for accommodating a fuel cell serving as a power source, wherein at least part of the cell compartment is formed from an external member having an opening for linking the space inside the cell compartment with the outside of a casing of the fourth electronic device.

The external member can be a lid which is opened and closed when the fuel cell is accommodated in the cell compartment.

An air-permeable member having air permeability and covering the opening from the side of the cell compartment can be further provided.

The fourth electronic device can be a camera.

In the fourth electronic device in accordance with the present invention, there is provided a cell compartment for accommodating a fuel cell serving as a fuel source and at least part of the cell compartment is formed from an external member having an opening for linking the space inside the cell compartment with the outside of a casing.

The camera in accordance with the present invention comprises a tripod socket, a cell compartment that can accommodate the fuel cell, and an opening allowing for contact of the fuel cell inside the cell compartment with the external air, wherein the opening is disposed on the surface on the same side as the tripod socket, and the tripod socket is disposed on one side and the opening is disposed on the other side so as to sandwich the pickup optical axis of the camera.

In the camera in accordance with the present invention, there are provided a tripod socket, a cell compartment that can accommodate the fuel cell, and an opening allowing for contact of the fuel cell inside the cell compartment with the external air, the opening is disposed on the part on the same side as the tripod socket, and the tripod socket is disposed on one side and the opening is disposed on the other side so as to sandwich the pickup optical axis of the camera.

DESCRIPTION OF THE PREFERRED EMBODIMENTS

First Embodiment

Figure 1:
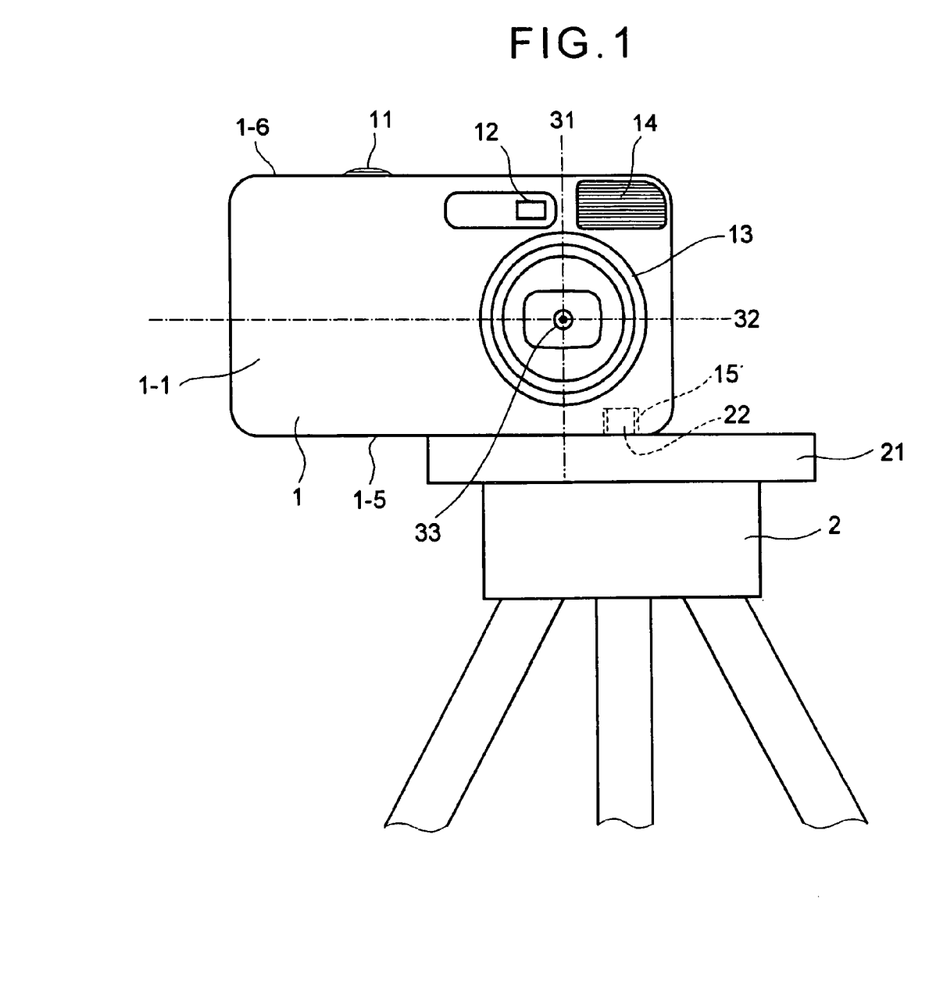
FIG. 1 is a front view illustrating an example of the external configuration of the camera employing the present invention.

FIG. 1 illustrates the example of the external configuration of the front surface of a camera as an electronic device employing the first embodiment of the present invention.

As shown in FIG. 1, a camera 1 can be attached to a pan head 21 of a tripod 2.

A release button 11 which is pushed when a user takes a picture of an object is provided on a side surface 1-6 which is one of the surfaces substantially perpendicular to a main surface 1-1 of the casing of the camera 1.

The surface 1-6 where the release button 11 is disposed will be hereinbelow called an upper surface and a surface 1-5 which is opposite to the upper surface 1-6 will be called a bottom surface, those surfaces being side surfaces which are substantially perpendicular to a main surface 1-1 of the casing of the camera 1. Here in FIG. 1, for example, among the normal directions to the bottom surface 1-5 of the casing of the camera 1, the direction from the bottom surface 1-5 to the upper surface 1-6 will be considered as an upward direction. Such a relationship between the upper surface, bottom surface, and upward direction is the same for other drawings (the below-described other embodiments), unless stated otherwise.

A light-emitting unit 14 for emitting light as a flash when the user takes a picture of the object is provided at the front surface 1-1 of the casing of the camera 1, in the upper right end portion thereof, and a finder 12 allowing the user to view the object is provided close to the light-emitting unit at the left side thereof. A lens-barrel 13 having taking lenses for taking a picture of the object is provided below the aforementioned components.

A tripod socket 15 is provided in the bottom surface 1-5 of the casing of the camera 1. The pan head 21 of a tripod 2 is connected to the bottom surface 1-5 of the casing of the camera 1 by engaging a tripod thread 22 of the tripod 2 with the tripod socket 15.

A normal 33 (line 33 which is substantially perpendicular to a vertical line 31 and a horizontal line 32) to the front surface 1-1 which is directed from the center of the lens-barrel 13 (taking lenses) toward the object when the camera 1 is disposed so as shown in FIG. 1 will be referred to hereinbelow as a pickup optical lens.

Figure 2:
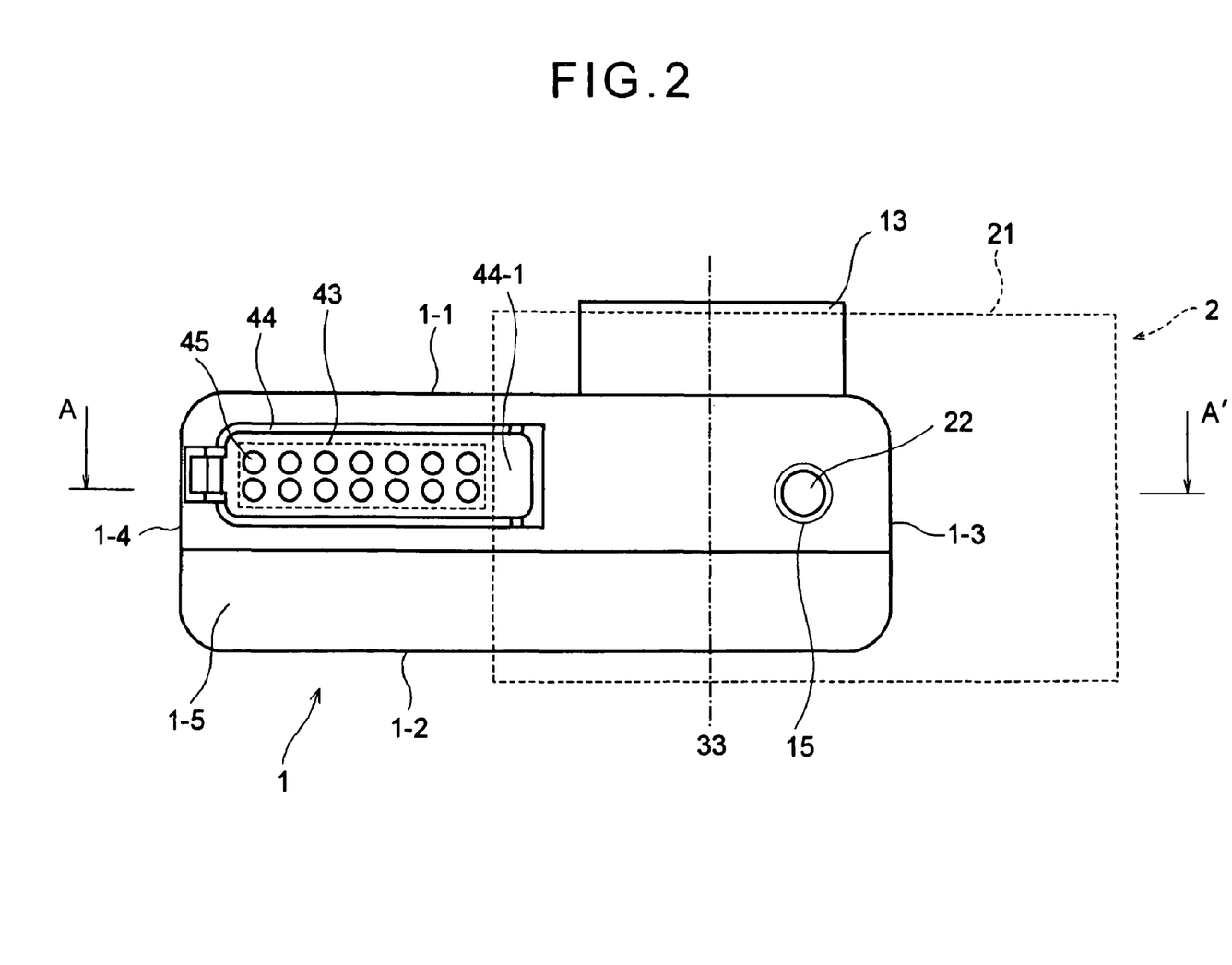
FIG. 2 is a bottom view illustrating an example of the external configuration of the camera shown in FIG. 1.

FIG. 2 is a bottom surface view of the camera 1 shown in FIG. 1. Thus, FIG. 2 shows the example of the external configuration of the bottom surface 1-5 of the casing of the camera 1.

Further, in FIG. 2, for example, the pickup optical axis 33 is taken as a virtual vertical line. Of the directions of the pickup optical axis 33, the direction from a rear surface 1-2

(the surface 1-2 which is opposite the front surface 1-1) of the casing of the camera 1 to the front surface 1-1 will be taken as an upward direction.

As shown in FIG. 2, the above-mentioned tripod socket 15 is provided in the bottom surface 1-5 of the casing of the camera 1, close to the right end portion of this surface, and a lid 44-1 of a cell compartment 44 for accommodating a fuel cell 43 is provided in the vicinity of the left end portion of this surface. Air orifices 45 for linking the space inside the cell compartment 44 with the outside of the casing of the camera 1 are provided in the lid 44-1 of the cell compartment 44.

The air orifices 45 are provided for introducing oxygen (air) used by the fuel cell 43 accommodated in the cell compartment 44 for generating electric power from the outside of the casing of the camera 1 into the space (fuel cell 43) inside the cell compartment 44.

Thus, at the bottom surface 1-5 of the casing of the camera 1, the air orifices 45 are disposed in the vicinity of the left end portion of the surface, and the tripod socket 15 is disposed in the vicinity of the right end portion. In other words, the air orifices 45 are disposed to the left and the tripod socket 15 is disposed to the right of the pickup optical axis 33 at the bottom surface 1-5 of the casing of the camera 1.

Such an arrangement is employed so as to maximize the distance between the air orifices 45 and the tripod socket 15. As a result, as shown in FIG. 2, even when the tripod 2 is connected to the camera 1, the air orifices 45 are not closed by the pan head 21 of the tripod 2, oxygen (air) can be normally supplied to the fuel cell 43 accommodated in the cell compartment 44, and the fuel cell 43 can continuously generate a sufficient quantity of electricity.

Thus, typically, when the camera 1 is connected to the tripod 2, the entire bottom surface 1-5 of the casing of the camera 1 is not covered with the pan head 21 of the tripod 2 and only part (in the example shown in FIG. 2, almost right half surface) of the bottom surface 1-5 is most often covered. Accordingly, the air orifices 45 are disposed in the vicinity of the end portion which is opposite to that where the tripod socket 15 is disposed, so that those air orifices are disposed in the portion of the bottom surface 1-5 which is not covered with the pan head 21 of the tripod. 2 In particular, when the camera 1 is a small camera, the tripod 2 often has three small legs and the surface area of the stand 21 is also small. Therefore, this effect becomes significant (the effect of preventing the air orifices 45 from being covered by the stand 21).

The arrangement positions of air orifices 45 are not limited to the example shown in FIG. 2, provided that they are in the portions of the bottom surface 1-5 which are not covered by the pan head 21 of the tripod 2. For example, when the tripod socket 15 is disposed in the vicinity of the left end portion of the bottom surface 1-5, the air orifices 45 may be disposed in the vicinity of the right end portion.

Further, the surface where the air orifices 45 are disposed is not limited to the bottom surface 1-5. However, because design requirements have been also placed in recent years on the camera casing, as was described hereinabove, it is preferred that the air orifices 45 be disposed on the bottom surface 1-5 so that the appearance is not degraded. Thus, as shown in FIG. 1, because the user most often holds the camera 1 so that the bottom surface 1-5 faces down, if the air orifices 45 are disposed on the bottom surface 1-5, those air orifices 45 can be seen neither by the user nor from the object and the appearance is not degraded.

Figure 3:
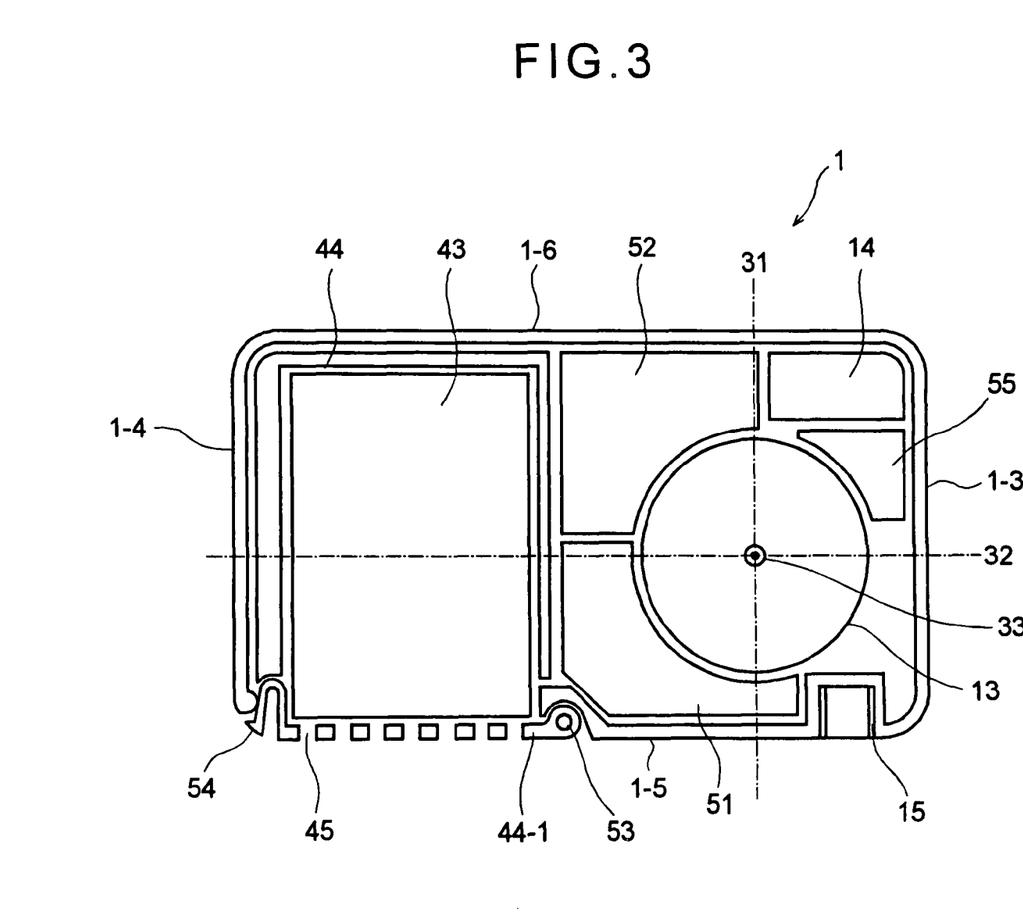
FIG. 3 is a vertical cross-sectional view of the A-A' portion of the camera shown in FIG. 1.

FIG. 3 represents the vertical cross section of the A-A' of the camera 1 shown in FIG. 2.

As shown in FIG. 3, the aforementioned cell compartment 44 for accommodating the fuel cell 43 is disposed at the left side (the side of the side surface 1-4 which is substantially perpendicular to the bottom surface 1-5 of the casing) inside the casing of the camera 1.

A lid 44-1 of the above-described cell compartment 44 is provided in the portion below the cell compartment 44 at the bottom surface 1-5 of the casing of the camera 1, and a hinge shaft 53 and a click 54 are provided in the lid 44-1. When the user installs or removes the fuel cell 43, the click 54 is operated rightward and the lid 44-1 is opened, with the hinge shaft 53 as an axis. Thus, the hinge shaft 53 is a shaft serving to open and close the lid 44-1, and the click 54 is a holding member which holds the lid 44-1 so that it cannot be opened when the lid 44-1 is closed.

The above-described air orifices 45 are also provided in the lid 44-1 (a plurality of air orifices 45 are opened in the lid 44-1). As described hereinabove, oxygen (air) is supplied from the outside of the casing of the camera 1 into the fuel cell 43 accommodated in the cell compartment 44 via the air orifice 45.

Inside the casing of the camera 1, a finder block 52 and a lens-barrel drive gear stand 51 are provided on the left side of the cell compartment 44 in the vicinity thereof, in the order from above, and the aforementioned light-emitting unit 14 is provided on the right side of the finder block 52 in the vicinity thereof. A substrate 55 which carries thereon a circuit for causing the light-emitting unit 14 to emit light is provided below the light-emitting unit, and the aforementioned tripod socket 15 is provided below the substrate. The above-mentioned lens-barrel 13 is provided between those finder block 52, lens-barrel drive gear stand 51, light-emitting unit 14, substrate 55, and tripod socket 15.

Further, the light-emitting unit 14, lens-barrel drive gear stand 51, finder block 52, and substrate 55 are not directly related to the present invention and can be readily understood by a person skilled in the art. For this reason, the explanation thereof is herein omitted.

Figure 4:
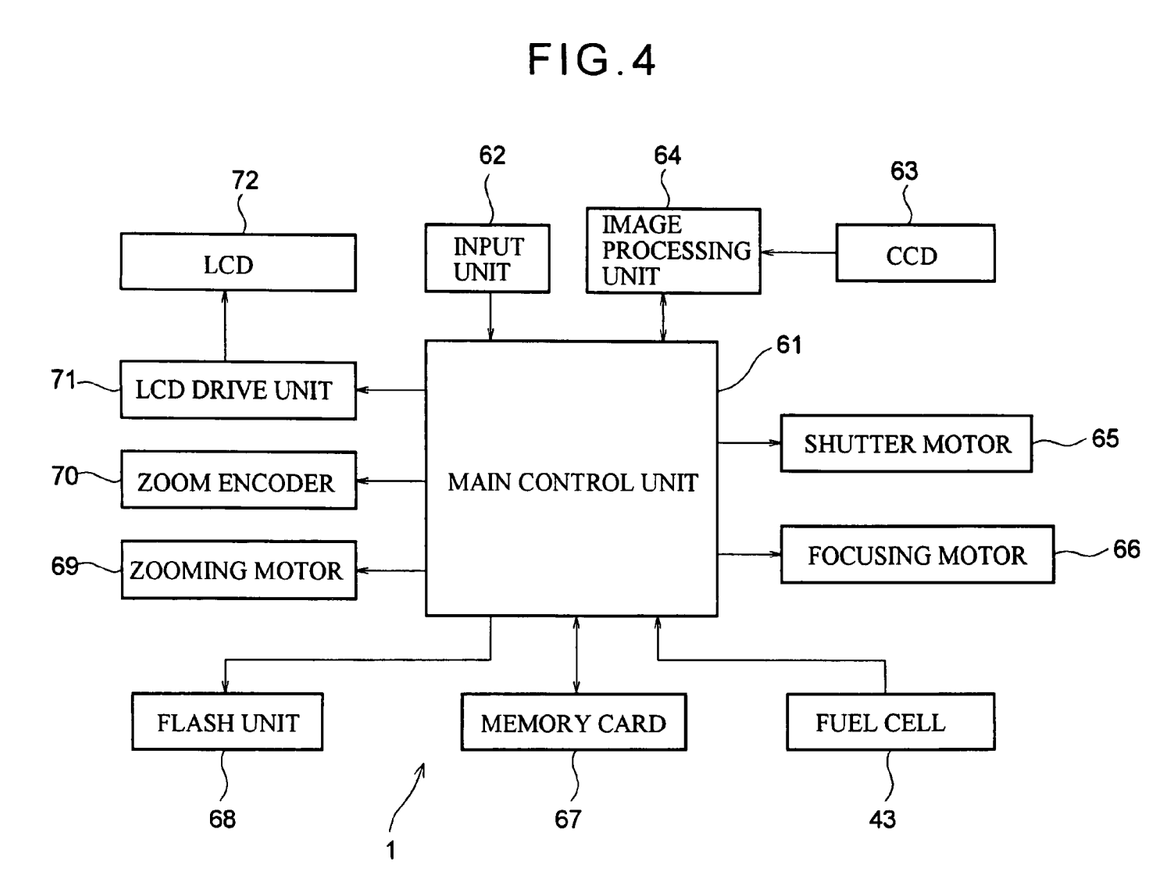
FIG. 4 is a block-diagram illustrating an example of electric configuration of the camera shown in FIG. 1.

FIG. 4 is a block diagram illustrating an electric configuration of the camera 1.

As shown in FIG. 4, the camera 1 comprises the fuel cell 43 (FIG. 2 and FIG. 3) as a power source accommodated in the above-described cell compartment 44 and a main control unit 61 for controlling the operation of the entire camera 1.

Thus, a CPU (Central Processing Unit), a ROM (Read Only Memory), a RAM (Random Access Memory), and the like, are provided in the main control unit 61 (those components are not shown in the figure), and the CPU controls the operation of the entire camera 1 according to the program that was loaded into the RAM from the program stored in the ROM or the like. Data necessary for the CPU to execute a variety of processing operations are appropriately stored in the RAM.

In other words, the main control unit 61 controls the below-described components from an image processing unit 64 to a LCD drive unit 71 in response to the signals inputted from the below-described input unit 62.

The camera 1 also comprises the input unit 62 composed of the above-described release button 11 (FIG. 1) and the like, a CCD (Charge Coupled Device) 63 for picking up the object and outputting image signals, an image processing unit 64 for conducting the prescribed image processing of the image signals from the CCD 63, a shutter motor 65 for opening a shutter (not shown in the figure) so as to pass the light from the lenses of the lens-barrel 13 (FIG. 1) within the prescribed exposure interval when the release button 11 is pushed down, and closing the shutter in other cases, a focusing motor 66 for adjusting the opening degree of an aperture (not shown in the figure) with respect to the lenses of the lens-barrel 13, a zooming motor 69 for extending or contracting the lens-barrel 13 for zooming, and a zoom encoder 70 for controlling the zooming motor 69.

The camera 1 further comprises a memory card 67 for storing the image data that were picket up by the CCD 63 and subjected to image processing by the image processing unit 64, a LCD (Liquid Crystal Display) drive unit 71 for controlling the display of the image data, a LCD 72 for displaying the images corresponding to the image data by controlling the LCD drive unit 71, the above-mentioned circuit substrate 55 (FIG. 3), and a flash unit 68 composed of the light-emitting unit 14. and functioning as a flash.

Further, the components from the main control unit 61 through the LCD 72 are not directly related to the present invention and can be readily understood by a person skilled in the art. For this reason, the explanation thereof (for example, the explanation of the method for mounting them on the camera 1) is herein omitted.

In the example shown in FIG. 4, only a fuel cell 43 is taken as a power source of the camera 1, but the present invention is not limited to the example shown in FIG. 4, and a secondary battery (not shown in the figure) such as a liquid ion battery may be used together with the fuel cell 43. In this case, a power source control unit (not shown in the figure) can be provided between the main control unit 61, fuel cell 43, and secondary battery. The power source control unit, for example, conducts control (switching control) by selecting either the fuel cell 43 or the secondary battery as the power source for the camera 1, or conducts control by charging the secondary battery from the fuel cell 43 and using the secondary battery as the main power source of the camera 1.

As described hereinabove, in the camera 1 which utilizes the first embodiment of the present invention, there are provided, as shown in FIG. 1 through FIG. 3, the cell compartment 44 for accommodating the fuel cell 43, the air orifices 45 for linking the space inside the cell compartment 44 with the outside of the casing and the tripod socket 15 for mounting the tripod 2, those components being disposed on the bottom surface 1-5 of the casing, wherein the air orifices 45 are disposed in the vicinity of the left end portion of the bottom surface 1-5 of the casing and the tripod socket 15 is disposed in the vicinity of the right end portion. In other words, the air orifices 45 are disposed on the left side and the tripod socket 15 is disposed on the right side of the pickup optical axis 33 of the camera 1 which is substantially parallel to the bottom surface 1-5 of the casing.

As a result, as shown in FIG. 2, even when the tripod 2 is connected to the camera 1, the air orifices 45 are not closed by the pan head 21 of the tripod 2, oxygen (air) can be normally supplied to the fuel cell 43 accommodated in the cell compartment 44, and the fuel cell 43 can continuously generate a sufficient quantity of electricity. Therefore, the main control unit 61 through LCD 72 shown in FIG. 4 can operate normally.

Second Embodiment

Figure 5:
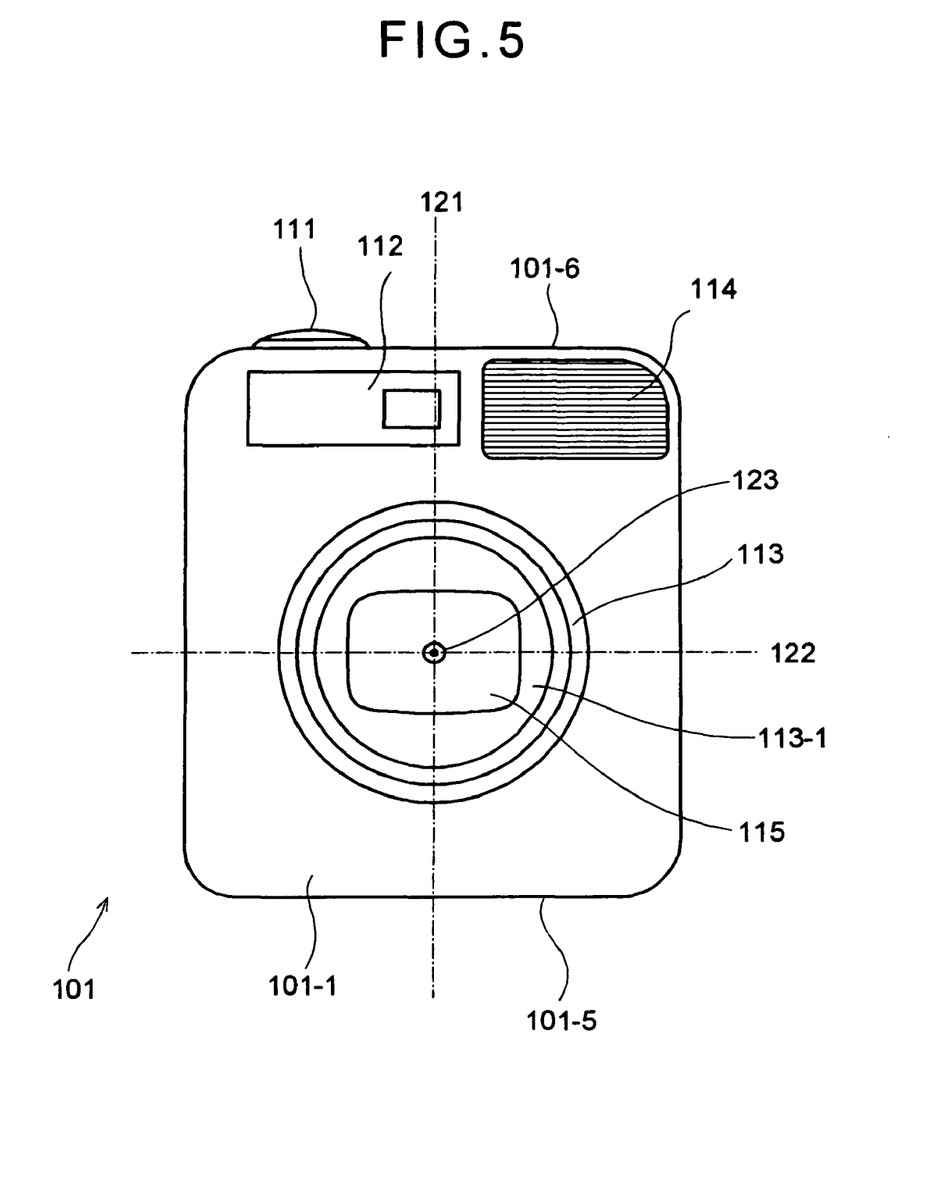
FIG. 5 is a front view illustrating another example of the external configuration of the camera employing the present invention.

FIG. 5 illustrates an example of the external configuration of the front surface of a camera as an electronic device employing the second embodiment of the present invention.

As shown in FIG. 5, here, a line 121 is a virtual perpendicular line, and a line 122 is a virtual horizontal line.

Further, when the camera 101 is disposed as shown in FIG. 5, similarly to the camera 1 (FIG. 1), a normal 123 (a line 123 which is substantially perpendicular to the perpendicular line 121 and horizontal line 122) to the front surface 101-1 facing the object from the center of the lens-barrel 113 is called a pickup optical axis.

As shown in FIG. 5, a release button 111 is provided on an upper surface 101-6 of the casing of the camera 101.

A finder 112 and a light-emitting unit 114 are provided on the front surface 101-1 of the casing of the camera 101, in the upper part thereof, from the left to the right. A lens-barrel 113 comprising a taking lens 115 for picking up the object is provided below those components (in the center, as shown in the figure).

Figure 6:
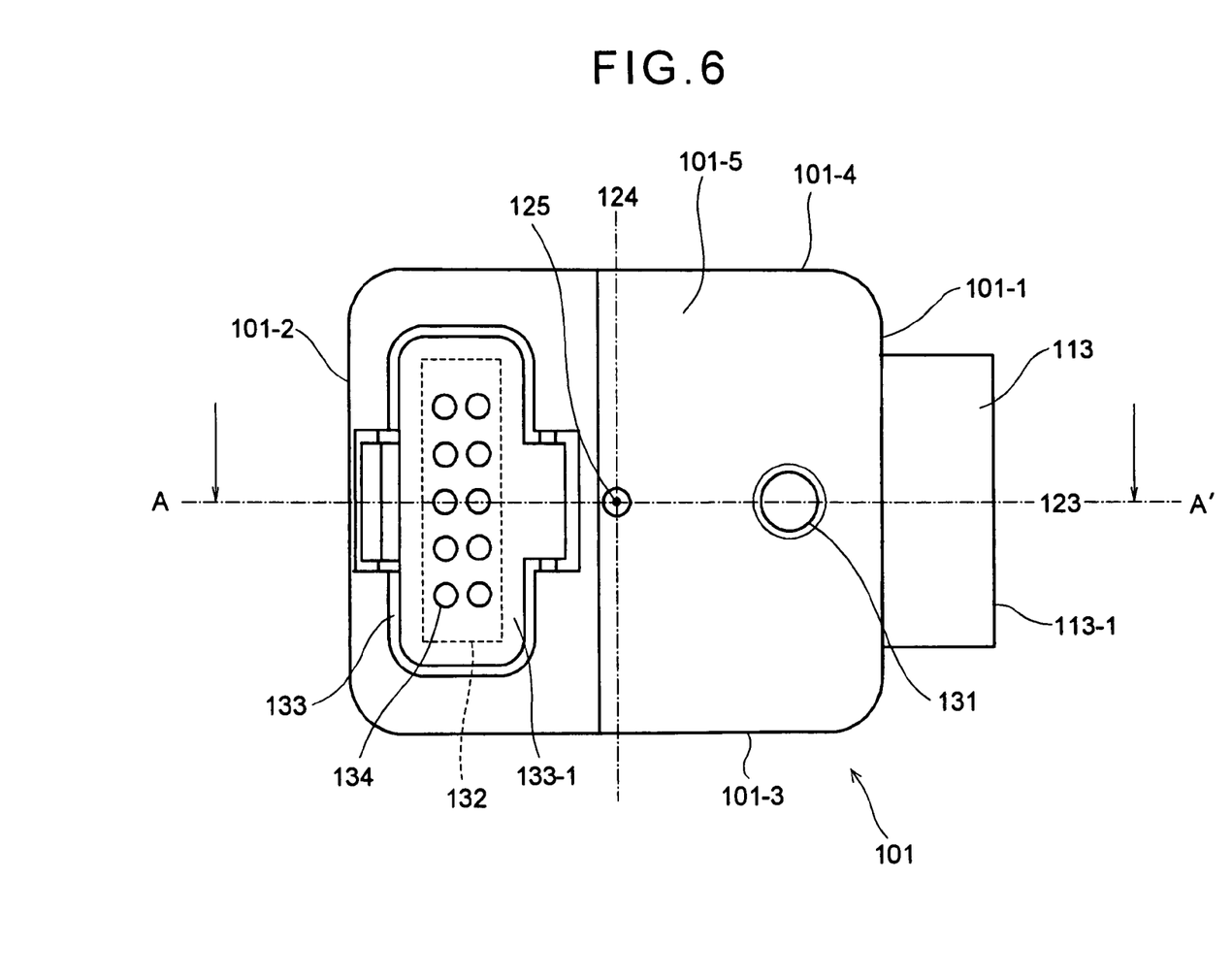
FIG. 6 is a bottom view illustrating an example of the external configuration of the camera shown in FIG. 5.

FIG. 6 is a bottom view of the camera 101 shown in FIG. 5. Thus, FIG. 6 shows the example of the external configuration of the bottom surface 101-5 of the casing of the camera 101.

Further, in FIG. 6, for example, the pickup optical axis 123 is taken as a virtual horizontal line, and the line 124 (line 124 substantially parallel to the bottom surface 101-5 and crossing the pickup optical axis 123 at about a right angle in the center of the bottom surface 101-5). Further, of the directions of the perpendicular 124, the direction from a side surface 101-3 which is substantially perpendicular to the bottom surface 101-5 of the casing toward the side surface 101-4 will be considered as an upward direction.

As shown in FIG. 6, a tripod 131 is provided in the vicinity of the right end portion of the bottom surface 101-5 of the casing of the camera 101, and a lid 133-1 of a cell compartment 133 for accommodating a fuel cell 132 is provided in the vicinity of the left end portion of this surface. Air orifices 134 for linking the space inside the cell compartment 133 with the outside of the casing of the camera 101 are provided in the lid 133-1 of the cell compartment 133.

The air orifices 134, similarly to the air orifices 45 of the above-described first embodiment (FIG. 1 through FIG. 3), are provided for introducing oxygen (air) used by the fuel cell 132 accommodated in the cell compartment 133 for generating electric power from the outside of the casing of the camera 101 into the space (fuel cell 132) inside the cell compartment 133.

Thus, at the bottom surface 101-5 of the casing of the camera 101, the air orifices 134 are disposed in the vicinity of the left end portion of the surface, and the tripod socket 131 is disposed in the vicinity of the right end portion. In other words, the tripod socket 131 is disposed in the vicinity of one end portion in the direction of the pickup optical axis 123 which is substantially parallel to the bottom surface 101-5, and the air orifices 134 are disposed in the vicinity of the other end portion.

Such an arrangement is employed, similarly to the above-described first embodiment, so as to maximize the distance between the air orifices 134 and the tripod socket 131. As a result, even when the tripod 2 shown in FIG. 1 is connected to the camera 101, the air orifices 134 are not closed by the pan head 21 of the tripod 2, oxygen (air) can be normally supplied to the fuel cell 132 accommodated in the cell compartment 133, and the fuel cell 132 can continuously generate a sufficient quantity of electricity.

Thus, typically, when the camera 101 is connected to the tripod 2 such as shown in FIG. 1, the entire bottom surface 101-5 of the casing of the camera 101 is not covered with the pan head 21 of the tripod 2 and only part (in the example shown in FIG. 6, mainly portion to the right from the line 124) of the bottom surface 101-5 is most often covered. Accordingly, the air orifices 134 are disposed in the vicinity of the end portion of the bottom surface 101-5 which is opposite to that where the tripod socket 131 is disposed, so that those air orifices are disposed in the portion of the bottom surface 101-5 which is not covered with the pan head 21 of the tripod 2. In particular, when the camera 101 is a small camera, the tripod 2 often has three small legs and the surface area of the stand 21 is also small. Therefore, this effect becomes significant (the effect of preventing the air orifices 134 from being covered by the pan head 21).

The arrangement positions of air orifices 134 are not limited to the example shown in FIG. 6, provided that they are in the portions of the bottom surface 101-5 which are not covered by the pan head 21 of the tripod 2. For example, when the tripod socket 131 is disposed in the vicinity of the left end portion of the bottom surface 101-5, the air orifices 134 may be disposed in the vicinity of the right end portion.

Figure 7:
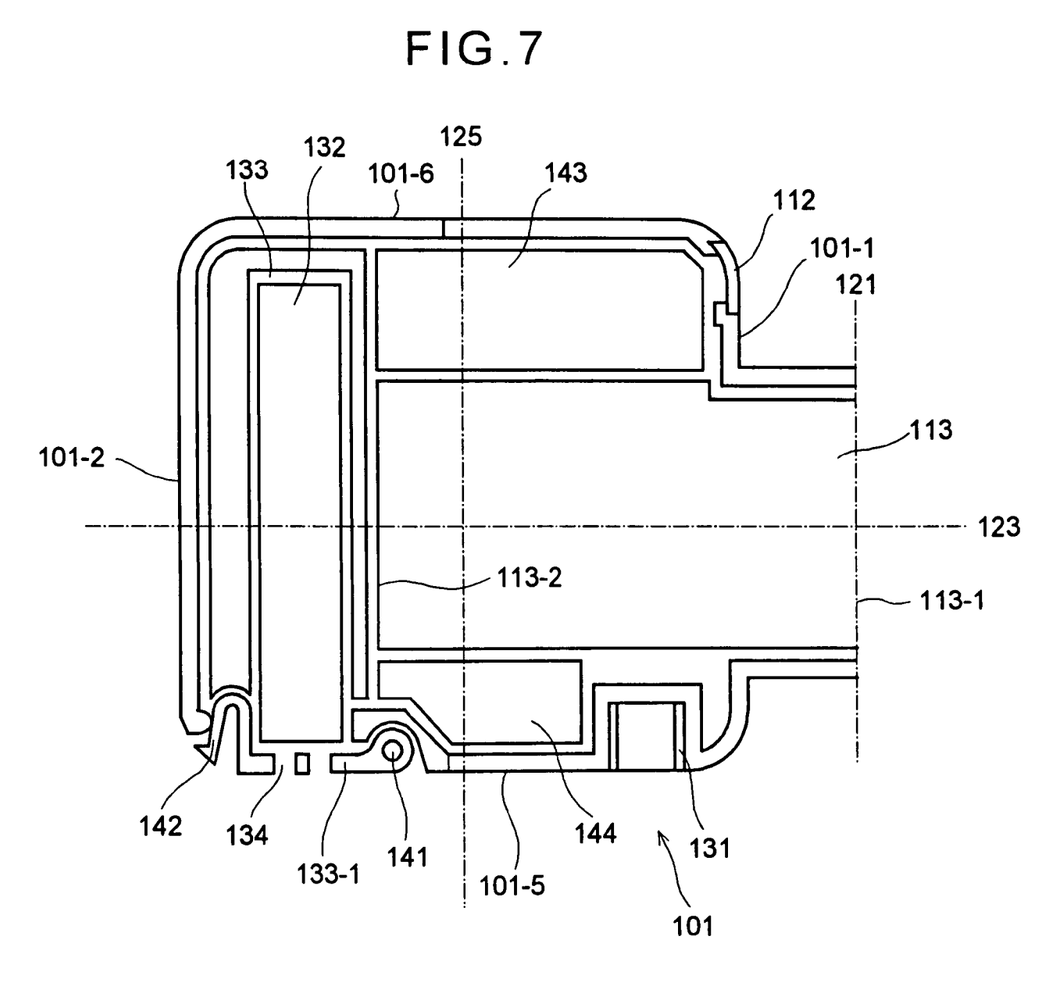
FIG. 7 is a vertical cross-sectional view of the A-A' portion of the camera shown in FIG. 6.

FIG. 7 represents the vertical cross section of the A-A' of camera 101 shown in FIG. 6.

In FIG. 7, the pickup optical axis 123 is taken as a virtual horizontal line, and a line 125 (a normal 125 to the bottom surface 101-5 passing through the center (intersection point of the pickup optical line 123 and virtual line 124) of the bottom surface 101-5 shown in FIG. 6) is taken as a virtual perpendicular.

As shown in FIG. 7, a lens-barrel 113 is provided inside the casing of the camera 101, almost in the center of the right half thereof, a finder block 143 is provided above the lens-barrel 113, and the above-described tripod socket 131 and a lens-barrel drive gear stand 144 are provided below the lens-barrel 113 from the right.

The above-mentioned cell compartment 133 for accommodating the fuel cell 132 is provided between the rear surface 113-2 (a surface 113-2 opposite to the front surface 113-1 where the taking lens is disposed) of the lens-barrel and the rear surface 101-2 (a surface 101-2 opposite to the front surface 101-1) inside the casing of the camera 101 and to the left of the lens-barrel 113 adjacently thereto.

A lid 133-1 of the above-described cell compartment 133 is provided in the portion below the cell compartment 133 at the bottom surface 101-5 of the casing of the camera 101, and a hinge shaft 141, a click 142, and the above-described air orifices 134 are provided in the lid 133-1, similarly to the lid 44-1 (FIG. 3) of the first embodiment. Thus, a plurality of air orifices 134 are opened in the lid 133-1 and, as described hereinabove, oxygen (air) is supplied via the air orifices 134 from the outside of the casing of the camera 101 into the fuel cell 132 accommodated in the cell compartment 133.

Further, the finder block 143 and lens-barrel drive gear stand 144 are not directly related to the present invention and can be readily understood by a person skilled in the art. For this reason, the explanation thereof is herein omitted.

The electric configuration of the camera 101, for example, may be similar to that of the camera 1 of the first embodiment. Thus, FIG. 4 is a block diagram representing also the electric configuration of the camera 101.

As described hereinabove, in the camera 101 which utilizes the second embodiment of the present invention, there are provided, as shown in FIG. 5 through FIG. 7, the cell compartment 133 for accommodating the fuel cell 132, the air orifices 134 for linking the space inside the cell compartment 133 with the outside of the casing, and the tripod socket 131 for mounting the tripod (for example, the tripod 2 shown in FIG. 1), those components being disposed on the bottom surface 101-5 of the casing, wherein the air orifices 134 are disposed in the vicinity of the left end portion of the bottom surface 101-5 of the casing and the tripod socket 131 is disposed in the vicinity of the right end portion, as shown in FIG. 6. In other words, the tripod socket 131 is disposed in the vicinity of one end portion of the bottom surface 101-5 of the casing in the direction of the pickup optical axis 123 and the air orifices 134 are disposed in the vicinity of the other end portion, as shown in FIG. 6.

As a result, even when the tripod (for example, the tripod 2 shown in FIG. 2) is connected to the camera 101, the air orifices 134 are not closed by the pan head 21 of the tripod 2, oxygen (air) can be normally supplied to the fuel cell 132 accommodated in the cell compartment 133 and the fuel cell 132 can continuously generate a sufficient quantity of electricity. Therefore, the components from the main control unit 61 through LCD 72 shown in FIG. 4 can operate normally.

Third Embodiment

Figure 8:
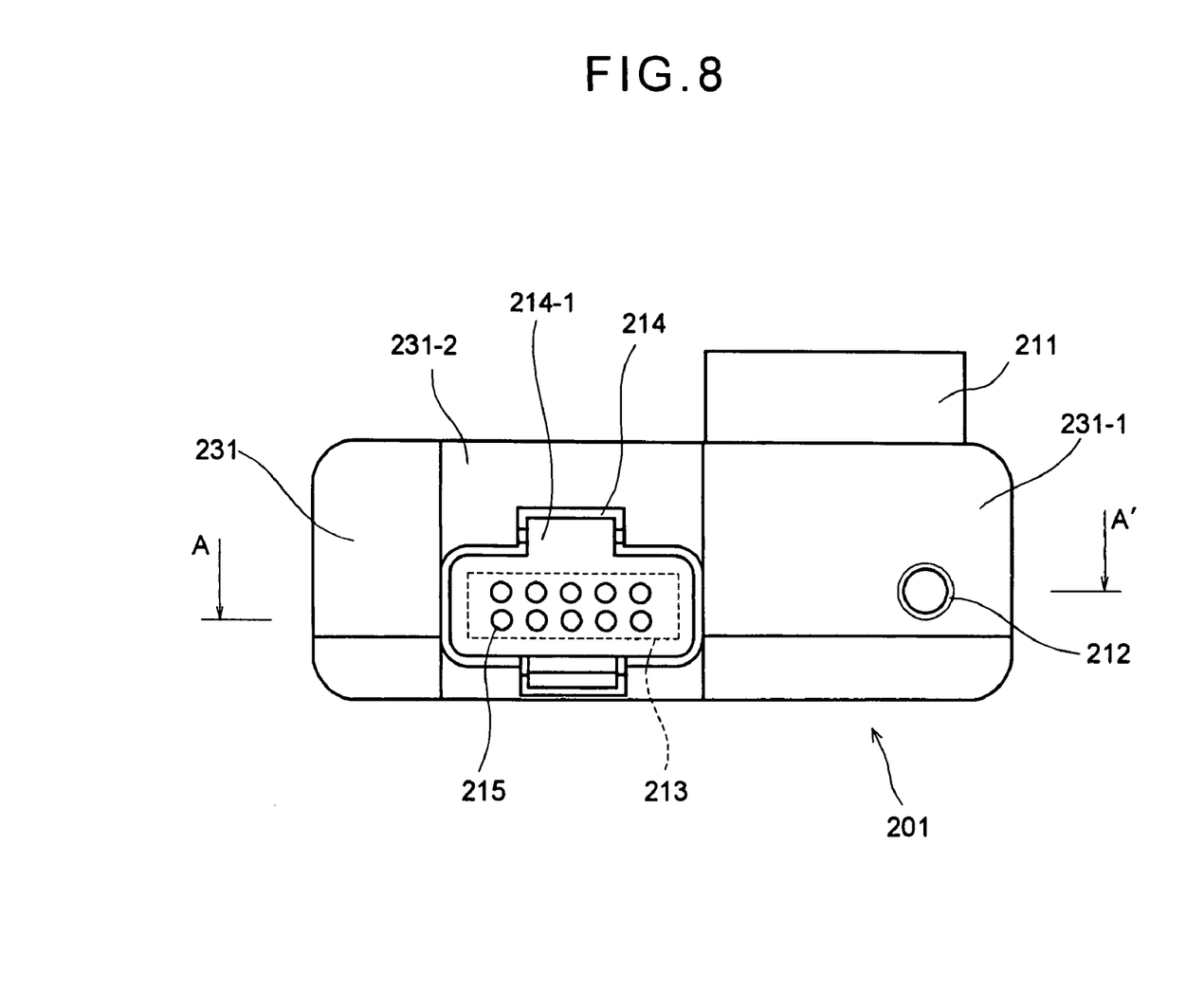
FIG. 8 is a front view illustrating another example of the external configuration of the camera employing the present invention.

FIG. 8 is a lower surface view of the electronic device employing the third embodiment of the present invention. Thus, FIG. 8 illustrates the example of the external configuration of a bottom surface 231 of the casing of a camera 201 employing the third embodiment of the present invention.

As shown in FIG. 8, the camera 201 is provided with a lens-barrel 211.

At the bottom surface 231 of the casing of the camera 201, a tripod socket 212 is provided in the first portion 231-1 and a lid 214-1 of the cell compartment 214 for accommodating the fuel cell 213 is provided in the second portion 231-2. Air orifices 215 for linking the space inside the cell compartment 214 with the outside of the casing of the camera 201 are provided in the lid 214-1 of the cell compartment 214.

Similarly to the air orifices (for example, air orifices 45 shown in FIG. 1 through FIG. 3) of the above-described first embodiment and second embodiment, the air orifices 215 are provided for introducing oxygen (air) used by the fuel cell 213 accommodated in the cell compartment 214 for generating electric power from the outside of the casing of the camera 201 into the space (fuel cell 213) inside the cell compartment 214.

Figure 9:
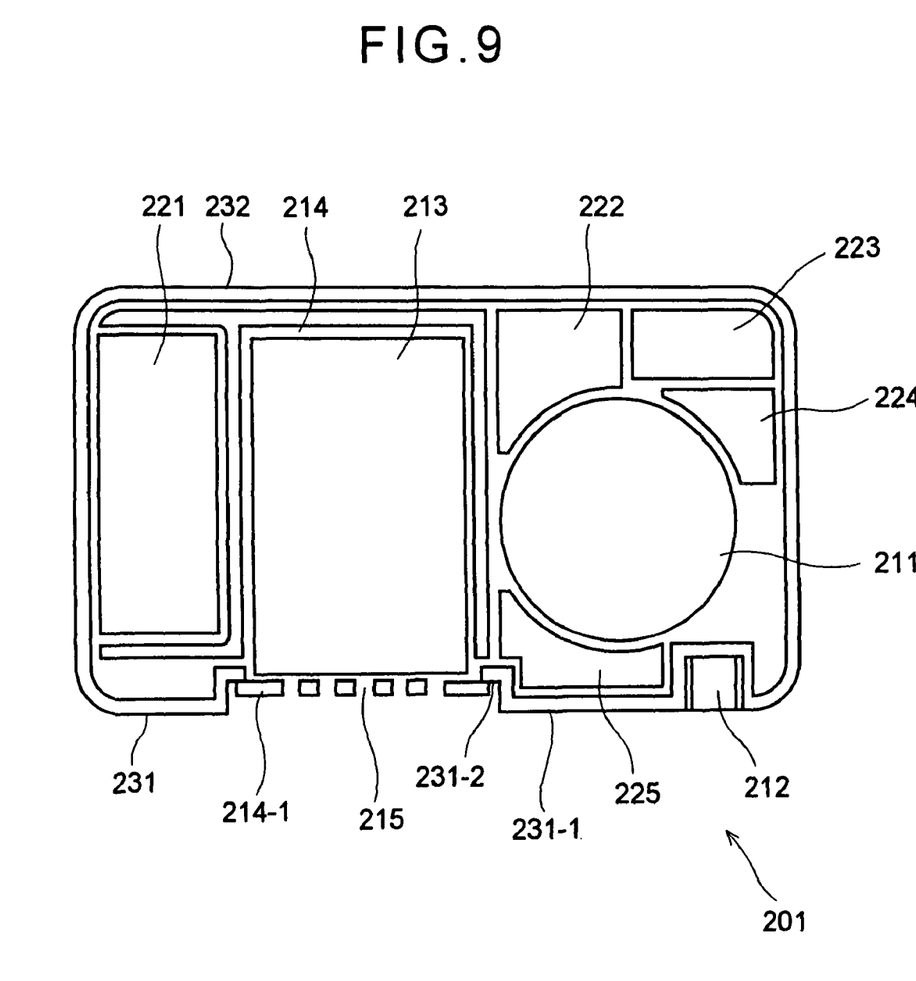
FIG. 9 is a vertical cross-sectional view of the A-A' portion of the camera shown in FIG. 8.

FIG. 9 is a vertical cross section of the A-A' portion of the camera 201 shown in FIG. 9.

As shown in FIG. 9, the second portion 231-2 of the bottom surface 231 of the casing of the camera 201, where the air orifices 215 (lid 214-1 of the cell compartment 214) are disposed, is recessed with respect to the first portion 231-1 where the tripod socket 212 is disposed.

As a result, when the tripod 2 shown in FIG. 1 is connected to the camera 201, a gap appears between the pan head 21 and the portion 231-2 where the air orifices 215 are disposed, even if the pan head 21 of the tripod 2 covers the entire bottom surface 231 of the casing of the camera 201. Therefore, the air orifices 215 are not closed by the pan head 21 of the tripod 2, oxygen (air) can be normally supplied to the fuel cell 213 accommodated in the cell compartment 214, and the fuel cell 213 can continuously generate a sufficient quantity of electricity.

A capacitor 221 for accumulating the energy (electric charge) for causing the below-described light-emitting unit 223 to emit light is provided inside the casing of the camera 201 at the left side thereof, and the above-described cell compartment 213 for accommodating the fuel cell 213 is provided at the right side in the vicinity thereof.

A finder block 222 is also provided above the cell compartment 213 and to the right therefrom inside the casing of the camera 201, and the light-emitting unit 223 is provided to the right therefrom in the vicinity thereof. A substrate 224 which carries thereon a circuit for causing the light-emitting unit 223 to emit light is provided below the light-emitting unit, and the aforementioned tripod socket 212 is provided below the substrate.

Inside the casing of the camera 201, a lens-barrel drive gear stand 225 is provided on the left side of the tripod socket 212 in the vicinity thereof. The above-mentioned lens-barrel 211 is provided between those finder block 222, light-emitting unit 223, substrate 224, tripod socket 212, and lens-barrel drive gear stand 225.

The capacitor 221, finder block 222, light-emitting unit 223, substrate 224, and lens-barrel drive gear stand 225 are not directly related to the present invention and can be readily understood by a person skilled in the art. For this reason, the explanation thereof is herein omitted.

The electric configuration of the camera 201 is identical, for example, to that of the camera 1 of the first embodiment. Thus, FIG. 4 is a block diagram representing also the electric configuration of the camera 201.

As described hereinabove, in the camera 201 which utilizes the third embodiment of the present invention, there are provided, as shown in FIG. 8 and FIG. 9, the cell compartment 214 for accommodating the fuel cell 213, the air orifices 215 for linking the space inside the cell compartment 214 with the outside of the casing, and the tripod socket 212 for connecting the tripod 2 shown in FIG. 1, those components being disposed on the bottom surface 231 of the casing, wherein the air orifices 215 are disposed in the second portion 231-2 which is recessed with respect to the first portion 231-1 where the tripod socket 212 is disposed, as shown in FIG. 9.

As a result, as described hereinabove, when the tripod 2 shown in FIG. 2 is connected to the camera 201, even if the pan head 21 of the tripod 2 covers the entire bottom surface 231 of the casing of the camera 201, a gap appears between the pan head 21 and the second portion 231-2 where the air orifices 215 are disposed. Therefore, the air orifices 215 are not closed by the pan head 21 of the tripod 2, oxygen (air) can be normally supplied to the fuel cell 213 accommodated in the cell compartment 214 and the fuel cell 213 can continuously generate a sufficient quantity of electricity.

Fourth Embodiment

Figure 10:
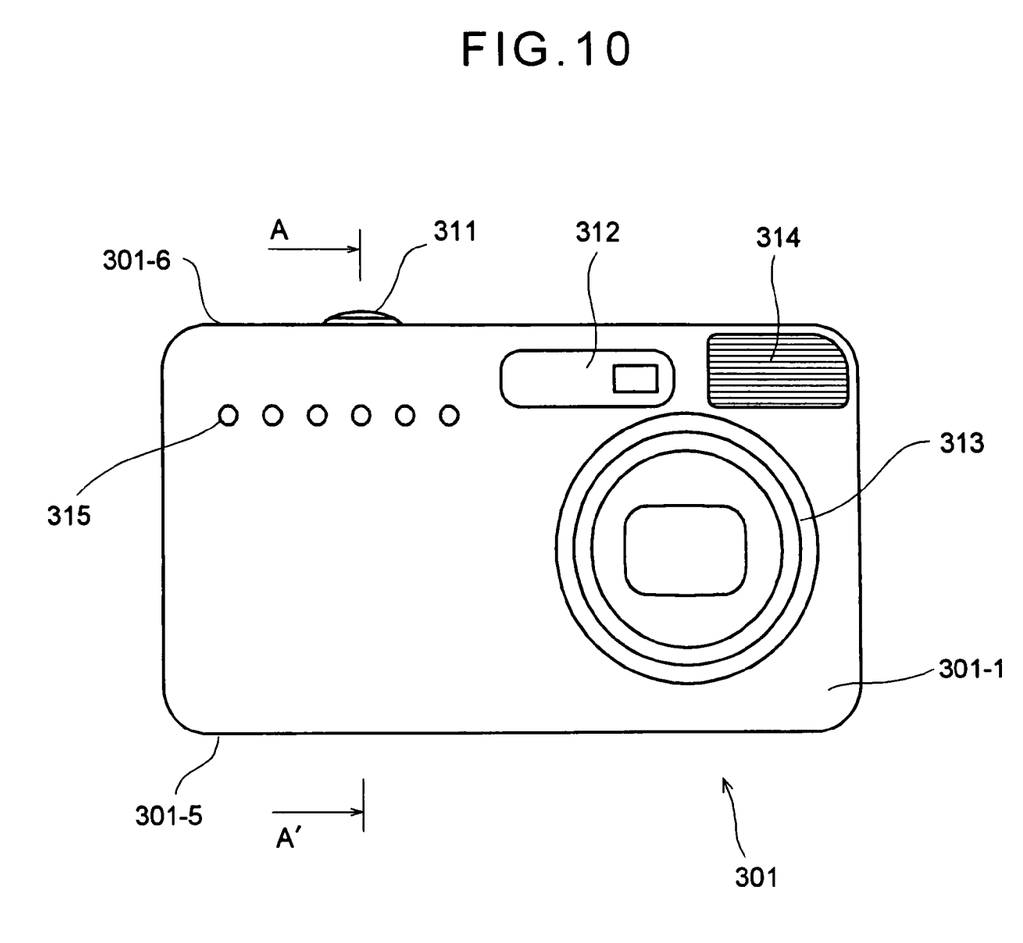
FIG. 10 is a front view illustrating another example of the external configuration of the camera employing the present invention.

FIG. 10 illustrates the example of the external configuration of the front surface of a camera as an electronic device employing the fourth embodiment of the present invention.

As shown in FIG. 10, a release button 311 is provided on the upper surface 301-6 of the casing of the camera 301.

Air orifices 315 for linking the space inside the casing (the inside of the below-described cell compartment 317 shown in FIG. 12) with the outside, a finder 312, and a light-emitting unit 314 are provided in the left-to-right direction in the order of description in the upper part of the front surface 301-1 of the casing of the camera 301. A lens-barrel 313 comprising a taking lens is provided below the finder 312 and light-emitting unit 314.

The air orifices 315 will be described below with reference to FIG. 12.

Figure 11:
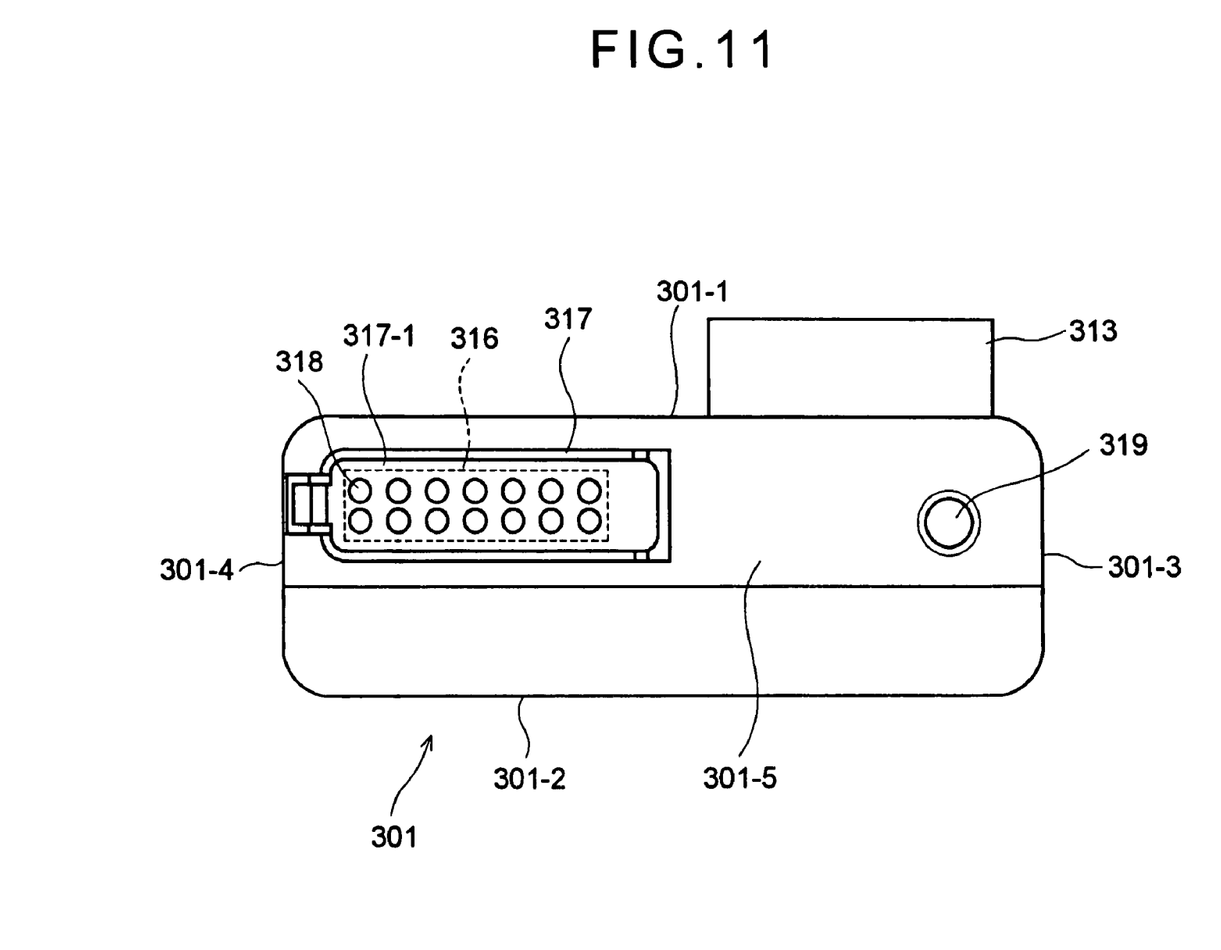
FIG. 11 is a bottom view illustrating an example of the external configuration of the camera shown in FIG. 10.

FIG. 11 is a lower surface of the camera 301 shown in FIG. 10. Thus, FIG. 11 illustrates the example of the external configuration of the bottom surface 301-5 of the casing of the camera 301.

Referring to FIG. 11, when the direction from the rear surface 301-2 to the front surface 301-1, among the directions perpendicular to the rear surface 301-2 (the surface 301-2 opposite to the front surface 301-1) of the camera 301, is taken as the upward direction, a tripod socket 319 is disposed at the bottom surface 301-5 of the casing of the camera 301 in the vicinity of the left end portion thereof and the lid 317-1 of the cell compartment 317 for accommodating the fuel cell 316 is provided in the vicinity of the left end portion of the bottom surface, similarly to the camera 1 (FIG. 2). Air orifices 318 for linking the space inside the cell compartment 317 with the outside of the casing of the camera 301 are provided in the lid 317-1 of the cell compartment 317.

The air orifices 318 will be explained hereinbelow together with the aforementioned air orifices 315, with reference to FIG. 12.

Figure 12:
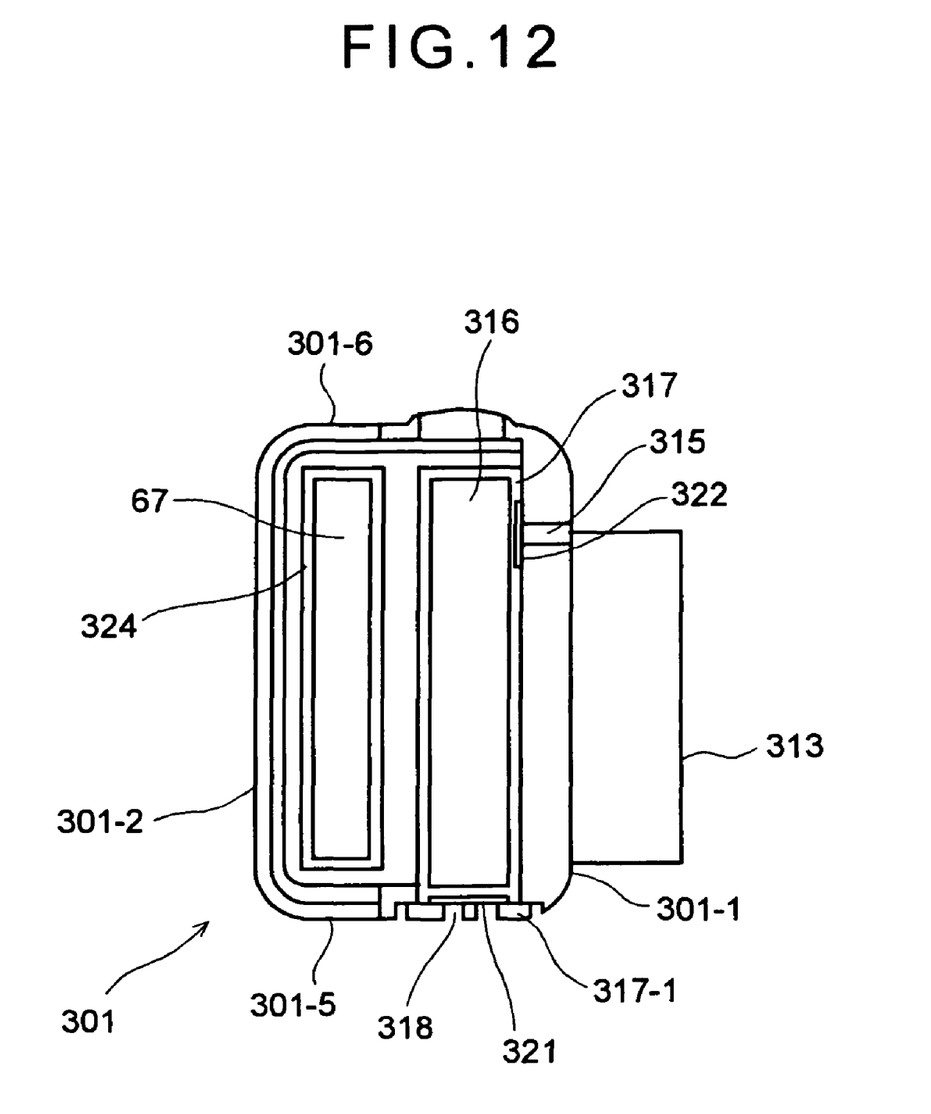
FIG. 12 is a vertical cross-sectional view of the A-A' portion of the camera shown in FIG. 11.

FIG. 12 is a vertical cross section of the A-A' portion of the camera 301 shown in FIG. 10.

Referring to FIG. 12, when the direction from the bottom surface 301-5 to the upper surface 301-6, among the directions perpendicular to the bottom surface 301-5 of the camera 301, is taken as the upward direction, a memory card compartment 324 for accommodating a memory card 67 (FIG. 4) and the above-described cell compartment 317 for accommodating the fuel cell 316 are provided from the left to the right inside the casing of the camera 301.

The above-mentioned air orifices 315 for linking the space inside the cell compartment 316 with the outside of the casing are provided in the upper part of the front surface 301-1 of the casing of the camera 301, and the air orifices 318 for linking the space inside the cell compartment 316 with the outside of the casing are provided on the bottom surface 301-5 of the casing, respectively.

A water-repellent sheet 322 having air permeability and covering the air orifices 315 from the side of the cell compartment 317, and a water-repellent sheet 321 having air permeability and covering the air orifices 318 from the side of the cell compartment 317 are further provided inside the casing of the camera 301.

The electric configuration of the camera 301 is identical, for example, to that of the camera 1 of the first embodiment. Thus, FIG. 4 is a block diagram representing also the electric configuration of the camera 301.

As described hereinabove, in the camera 301 which utilizes the fourth embodiment of the present invention, there are provided, as shown in FIG. 10 through FIG. 12, the cell compartment 317 for accommodating the fuel cell 316, the first air orifices 318 for linking the space inside the cell compartment 317 with the outside of the casing, those air orifices being disposed at the bottom surface 301-5 of the casing, and the second air orifices 315 for linking the space inside the cell compartment 317 with the outside of the casing, those air orifices being disposed at the front surface 301-1 of the casing.

Thus, among the surfaces constituting the casing, not only on the first surface, but also the second surface other than the first surface is provided with the air orifices for linking the space inside the cell compartment with the outside of the casing. Therefore, circulation of the air inside the cell compartment and the outer air can be increased.

The first and second surfaces where the air orifices are provided are not limited to the example shown in FIG. 12 (not limited to the bottom surface 301-5 and front surface 301-1) and may be any surfaces, provided that they constitute the casing. Furthermore, the air orifices may be provided on more than two surfaces.

However, the air orifices 318 may be provided at least on the bottom surface 301-5, as shown in FIG. 12. In this case, the following effect can be demonstrated.

Thus, for example, when the camera 301 executes an operation rapidly consuming electric power, such as continuous light emission by the light-emitting unit 314 (FIG. 10), oxygen present inside the cell compartment 317 is consumed by the fuel cell 316 on power generation and the amount of carbon dioxide is increased. In this case, because carbon dioxide is heavy, it is accumulated in the lower portion of the cell compartment 317. However, because the air orifices 318 are opened in the bottom surface 301-5 of the casing of the camera 301, this carbon dioxide is released from the air orifices 318 to the outside of the casing.

As a result, new air (oxygen) is sucked into the cell compartment 317 from the air orifices 315 opened at the front surface 301-1 of the casing and supplied to the fuel cell 316 accommodated in the cell compartment 317. Therefore, fuel cell 316 can continuously generate a sufficient quantity of electricity. As a result, the main control unit 61 through LCD 72 shown in FIG. 4 can operate normally.

If the air orifices are opened in the casing, moisture or dust can easily penetrate through those air orifices into the casing. Air-permeable sheets such as the above-mentioned water-repellent sheet 321 and water-repellent sheet 322 (FIG. 12) are used to resolve this problem.

However, the problem associated with the configuration in which the air orifices are simply provided in the casing and the air orifices are covered from inside of the casing with the air-permeable sheet is that once the air-permeable sheet has degraded and has to be replaced, the camera itself has to be disassembled.

Accordingly, in order to resolve this problem, in the camera 301 shown in FIG. 12, at least part of the cell compartment 317 is formed from an external member having air orifices for linking the space inside the cell compartment 317 with outside of the casing. More specifically, as shown in FIG. 11 and FIG. 12, air orifices 318 are open in the lid 317-1 of the cell compartment 317 serving as the external member, and a water-repellent sheet 321 having air permeability is so provided as to cover the air orifices 318 from the side of the cell compartment 317. Therefore, the user can replace the water-repellent sheet 321 simply by opening the lid 317-1 of the cell compartment 317. Therefore, maintainability of the camera 301 can be improved.

Further, because the air orifices 315 are also provided in the front surface 301-1 of the casing in the camera 301, the cell compartment 317 itself is formed as the external member. As a result, even if moisture or dirt penetrated into the cell compartment 317, those moisture or dirt remain inside the cell compartment. Therefore, the user can remove those moisture and dirt by simply wiping the inside of the cell compartment and maintainability of the camera 301 can be further improved.

As described hereinabove, in the cameras of the first through third embodiments (camera 1 (FIG. 2 and FIG. 3), camera 101 (FIG. 6 and FIG. 7), and camera 201 (FIG. 8 and FIG. 9)), air orifices are provided only in the lid of the cell compartment. Therefore, the effect identical to that of the camera 301 can be demonstrated if the user simply places an air-permeable sheet such as the water-repellent sheet 321 on the rear side of the lid of the cell compartment (on the inside of the casing).

Further, the electronic device that can employ the present invention is not limited to the above-described camera and may be any electronic device using a fuel cell as a power source. For example, the present invention can be used in cellular phones or portable information processing terminals such as PDA (Personal Digital Assistants).

As described hereinabove, the present invention makes it possible to use a fuel cell as a power source for an electronic device. In particular, it can provide for reliable supply of oxygen, which is necessary for the fuel cell to generate electric power, to the fuel cell.

What is claimed is:

1. An electronic device employing a fuel cell as a power source, comprising:
a cell compartment inside a casing of said electronic device for accommodating said fuel cell;
an opening disposed in a lower surface of said casing, for linking the space inside said cell compartment with the outside of said casing and introducing external air into said cell compartment inside said casing;
and a mounting unit disposed on said lower surface where said opening is disposed, for mounting other devices on said electronic device, wherein
said mounting unit is disposed in the vicinity of one end portion of said surface of said casing and said opening is disposed in the vicinity of the other end portion; and
said opening is disposed in a second portion of said lower surface of said casing, wherein said second portion is recessed with respect to a first portion where said mounting unit is disposed.

2. The electronic device according to claim 1, wherein
said electronic device is a camera;
said other device is a tripod; and
said mounting unit is a tripod socket.

3. The electronic device according to claim 2, wherein
said tripod socket is disposed either on the right side or left side with respect to a pickup optical axis of said camera which is substantially parallel with said lower surface of said casing, and said opening is disposed on the other side.

4. The electronic device according to claim 2, wherein
said tripod socket and said opening are disposed in the vicinity of one end portion and in the vicinity of the other end portion in the direction of said pickup optical axis of said camera which is substantially parallel with said lower surface of said casing, respectively.

5. The electronic device according to claim 4, further comprising:
a lens-barrel having a taking lens at the front surface thereof, wherein
said lower surface of said casing is substantially perpendicular to the front surface of said casing at the side where said taking lens is disposed,
said cell compartment is disposed between the rear surface of said casing and the rear surface of said lens-barrel and
said opening is disposed in the portion of said lower surface of said casing, which is below said cell compartment.

6. The electronic device according to claim 1, further comprising:
a second opening disposed in the external surface of said casing, which is different from said lower surface, for linking the space inside said cell compartment with the outside of said casing and introducing external air into said cell compartment inside said casing.

7. The electronic device according to claim 6, wherein
said electronic device is a camera having a taking lens, and
said lower surface of said casing is substantially perpendicular to the front surface of said casing on the side where said taking lens is disposed.

8. The electronic device according to claim 1, further comprising:
a lid of said cell compartment that is opened and closed when said fuel cell is accommodated in said cell compartment and includes said opening.

9. The electronic device according to claim 8, further comprising an air-permeable member having air permeability and covering said opening from the side of said cell compartment.

10. The electronic device according to claim 8, wherein said electronic device is a camera.

11. The electronic device according to claim 1, wherein
said opening can introduce the external air into said cell compartment when a lid of said cell compartment, which is opened and closed when said fuel cell is accommodated in said cell compartment and includes said opening, is closed.

* * * * *